No. 853,321. PATENTED MAY 14, 1907.
G. G. RICHMOND.
PATTERN MAKER'S TOOL.
APPLICATION FILED JAN. 2, 1907.
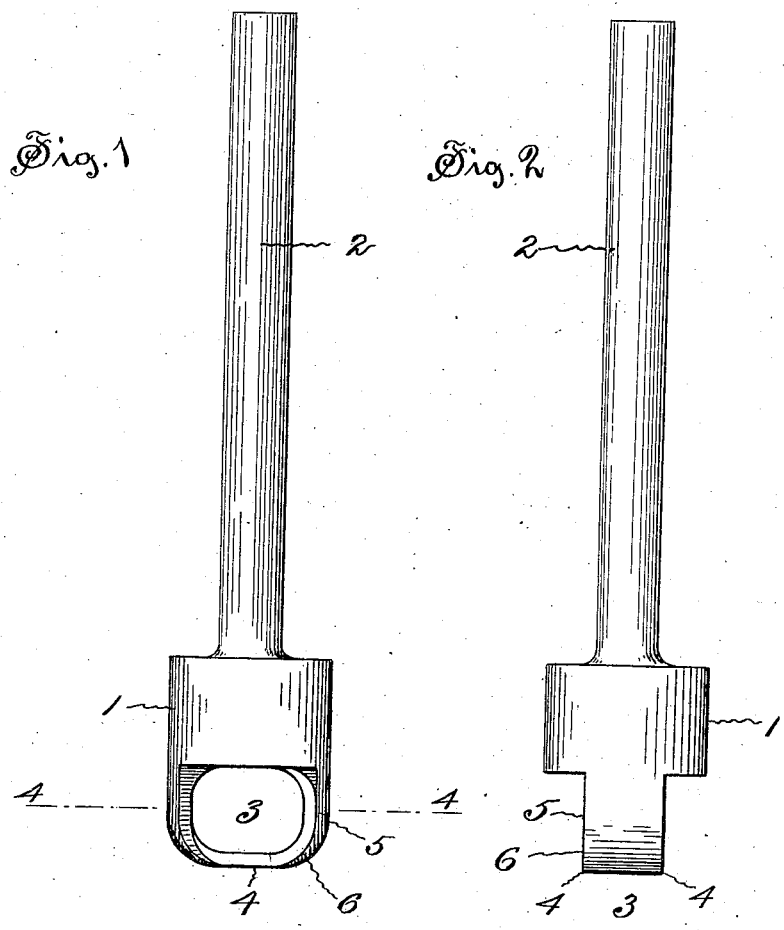
Witnesses: 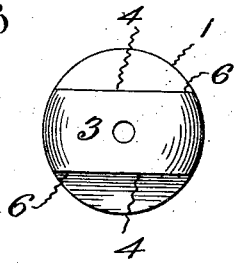
Inventor: 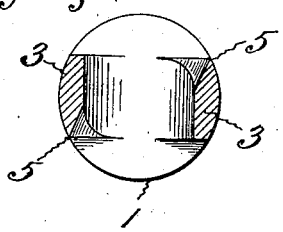

UNITED STATES PATENT OFFICE.

GEORGE G. RICHMOND, OF NORWALK, CONNECTICUT.

PATTERN-MAKER'S TOOL.

No. 853,321.　　　Specification of Letters Patent.　　　Patented May 14, 1907.

Application filed January 2, 1907. Serial No. 350,512.

*To all whom it may concern:*

Be it known that I, GEORGE G. RICHMOND, a citizen of the United States, residing at Norwalk, in the county of Fairfield and State of Connecticut, have invented a new and useful Pattern-Maker's Tool, of which the following is a specification.

This invention relates to a tool which is designed to so cut the wood as to leave the fillet which is required on patterns.

The object of the invention is to produce a very simple tool which can be used by any pattern maker in a lathe, boring tool or profiling machine for cutting out the wood and leaving a fillet in the corners that has a desirable curve and that merges into the adjacent surfaces smoothly and without ridge or scar.

The tool illustrated as embodying the invention has a head with a shank by means of which it can be held by a chuck or fastened in the tool spindle of the machine with which it is to be used, and a yoke-shaped cutter which has longitudinal, transverse and curved cutting edges which form the blades that cut the side, bottom and curved fillet walls of the pattern.

In use the wood is usually first cut out with a square cutting tool as far as the plane of the beginning of the fillet and then the tool which forms the subject of this invention is used to complete the cut and leave the round corner or fillet which is desired.

Figure 1 of the accompanying drawings is a view looking at one side of the tool. Fig. 2 is a view looking at another side. Fig. 3 is a view looking at the cutter end of the head; and Fig. 4 is a sectional view on the plane indicated by the dotted line 4—4.

The head 1 of this tool is cylindrical and the shank 2 which is preferably round is desirably made integral with the head. The yoke-shaped cutter 3 is also preferably formed integral with the head by simply milling off two sides and making a transverse opening through the flattened portion.

The end of the cutter is ground and sharpened so as to form on both edges, cutting blades 4 that extend transversely with relation to the axis of the tool. The sides of the cutter are each ground and sharpened so as to form a cutting blade 5 that will extend longitudinally of the axis of the tool on one edge of each side. And the curved portions between the sides and the end are sharpened to form curved blades 6 that merge with the longitudinal and transverse blades. This tool may be fastened by means of the shank in a chuck or in the spindle of a lathe, boring tool or profiling machine, and when it is presented to the wood the longitudinal blades on the edges of the sides of the yoke-shaped cutter form the side of the opening, the transverse cutting blades on the edges of the end form the bottom of the opening and the curved cutting blades that join the sides and the end form the fillet or rounded section between the side and bottom of the opening.

When used the tool cuts the wood in such way that there is no line or scarring observable between the fillet and the side and end walls of the pattern for the round body guides the cutting edges and prevents them from digging in.

This tool is very simple to make and to keep sharp, it always keeps its shape for it is ground for sharpening in the inside of the yoke, and it can be used by any pattern maker to form the necessary fillet along a straight or curved open section of a pattern or in the corners of a straight or curved recess in a pattern.

The size of the tool may, of course, be varied and the curvature of the curved cutting blades may be changed without departing from the invention.

The invention claimed is:

1. A pattern maker's tool having a cylindrical guiding head and a solid yoke-shaped cutter extending from the end of the head, said cutter having blades that co-incide with the peripheral surface of the head, integral blades extending at right-angles thereto and co-inciding with the outer end surface of the yoke, and curved blades that join and merge into both the side and end blades, substantially as specified.

2. A pattern maker's tool having a cylindrical guiding head and a yoke-shaped cutter with continuous, longitudinal, transverse and curved blades, the outer end of said yoke being solid and without projections from the outer surface, substantially as specified.

GEO. G. RICHMOND.

Witnesses:
　E. HILL, Jr.,
　HARRY R. WILLIAMS.